United States Patent
Patil et al.

(10) Patent No.: US 11,461,565 B2
(45) Date of Patent: Oct. 4, 2022

(54) APPARATUS AND METHODS FOR REMOTE CONTROLLED COLD STORAGE OF DIGITAL ASSETS USING NEAR FIELD COMMUNICATION TAGS

(71) Applicant: Blockchain Innovation, LLC, Fort Worth, TX (US)

(72) Inventors: Atul Patil, Indore (IN); Austin Trombley, San Francisco, CA (US)

(73) Assignee: Blockchain Innovation, LLC, Fort Worth, TX (US)

( * ) Notice: Subject to any disclaimer, the term of this patent is extended or adjusted under 35 U.S.C. 154(b) by 170 days.

(21) Appl. No.: 16/733,045

(22) Filed: Jan. 2, 2020

(65) Prior Publication Data

US 2020/0226332 A1 Jul. 16, 2020

Related U.S. Application Data

(60) Provisional application No. 62/788,012, filed on Jan. 3, 2019.

(51) Int. Cl.
*H04L 9/32* (2006.01)
*H04L 29/06* (2006.01)
*G06K 7/10* (2006.01)
*H04L 9/40* (2022.01)

(52) U.S. Cl.
CPC ........ *G06K 7/10297* (2013.01); *H04L 9/3252* (2013.01); *H04L 63/1466* (2013.01)

(58) Field of Classification Search
CPC .............. G06K 7/10297; H04L 9/3252; H04L 63/1466
See application file for complete search history.

(56) References Cited

U.S. PATENT DOCUMENTS

| | | | |
|---|---|---|---|
| 10,068,228 B1* | 9/2018 | Winklevoss | H04L 9/3239 |
| 11,139,955 B1* | 10/2021 | So | G06Q 20/3674 |
| 2012/0324230 A1* | 12/2012 | Osborne | H04L 9/3247 713/176 |
| 2018/0157841 A1* | 6/2018 | Shin | G06F 21/44 |
| 2018/0367311 A1* | 12/2018 | Stahlberg | H04L 9/3234 |
| 2018/0367316 A1* | 12/2018 | Cheng | H04L 9/3234 |
| 2019/0005284 A1* | 1/2019 | Hueber | H04B 5/0031 |
| 2019/0318356 A1* | 10/2019 | Martin | H04L 9/0637 |

(Continued)

*Primary Examiner* — Darshan I Dhruv
(74) *Attorney, Agent, or Firm* — Nelson Bumgardner Conroy P.C.; Carder W. Brooks; Brent N. Bumgardner

(57) ABSTRACT

An air-gapped system enables the secure transfer and control of digital assets, such as those associated with cryptocurrency. The system includes an Integration Server for receiving requests from an application interface, a Central Control Center for verifying the requests received and authorizing the requests using digital signatures, and multiple Distributed Data Centers, each including a cold Data Center Hardware Security Module (DC HSM). These DC HSMs securely store and manage cryptographic keys. Each Data Center also includes an offline Processing Unit coupling its DC HSM to a dedicated Remote Controlled Server. The Remote Controlled Server receives requests from the Integration Server and forwards them to the Processing Unit of a DC HSM using a Near-Field Communication (NFC) Interface between the two. Preferably, the NFC interface is physically shielded to resist side channel attacks.

15 Claims, 6 Drawing Sheets

(56) References Cited

U.S. PATENT DOCUMENTS

2019/0354970 A1\* 11/2019 Di Iorio ................ H04L 9/0869
2020/0028675 A1\* 1/2020 Gancarz ................ G06Q 20/02
2020/0044863 A1\* 2/2020 Yadlin .................. H04L 9/3247

\* cited by examiner

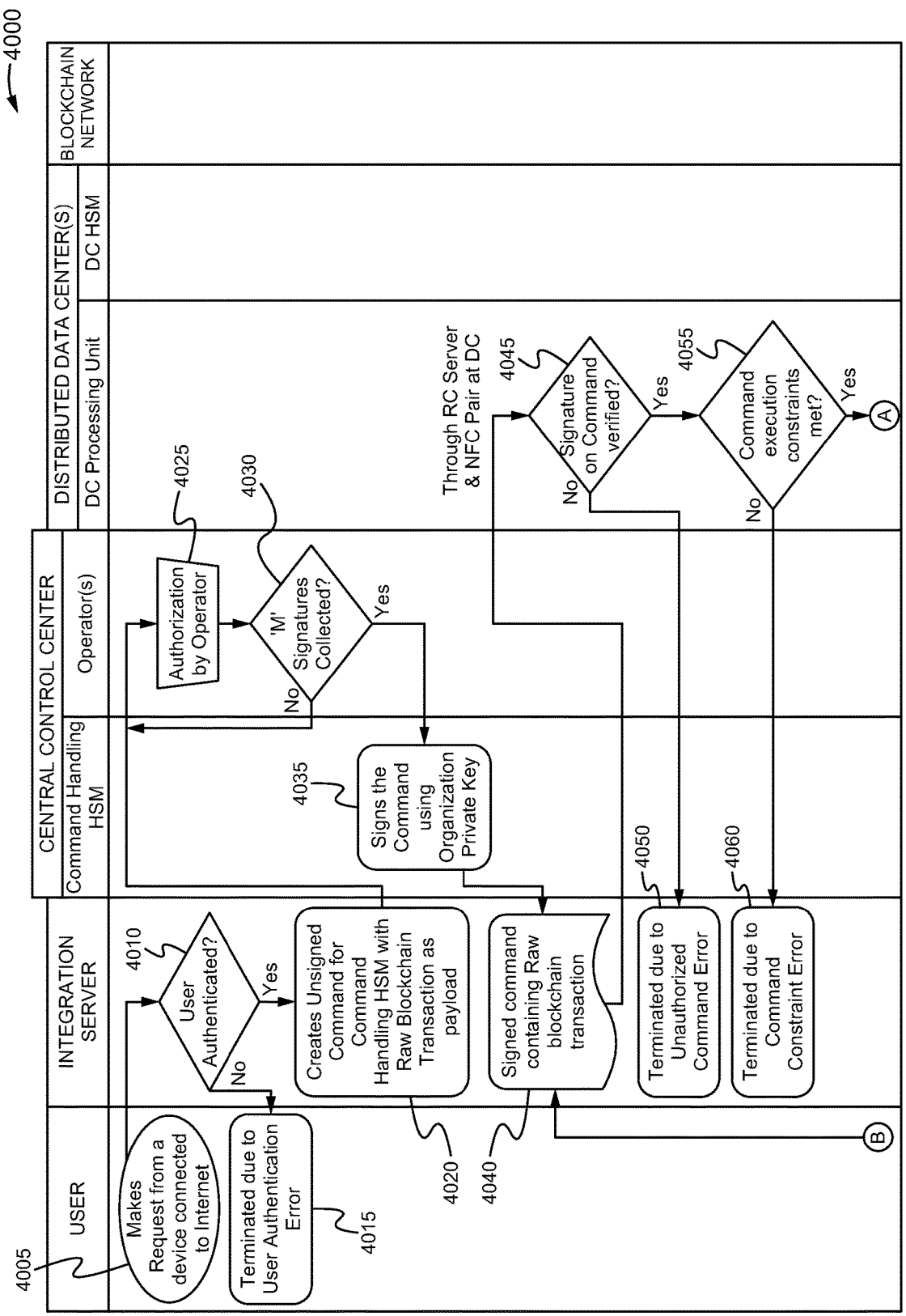
Fig. 4A (continued on 4B)

APPARATUS AND METHODS FOR REMOTE CONTROLLED COLD STORAGE OF DIGITAL ASSETS USING NEAR FIELD COMMUNICATION TAGS

RELATED APPLICATION(S)

This application claims priority under 35 U.S.C. § 119(e) of the U.S. Provisional Patent Application Ser. No. 62/788, 012, filed Jan. 3, 2019, and titled "Apparatus and a Method for Remote Controlled Cold Storage of Digital Assets Using Near Field Communication (NFC) Tags," which is hereby incorporated by reference in its entirety.

FIELD OF THE INVENTION

This invention is related to protecting digital assets accessible over computer networks. More specifically, this invention is related to protecting digital assets on a blockchain system by isolating digital wallets from Internet-based attacks.

BACKGROUND OF THE INVENTION

Online asset transactions, such as banking withdrawals, title transfers, and supply chain management, typically involve a central bank, title company, or other central institution. These transactions are prone to attack and inefficiencies, such as cyberattack at the central location, fraud, delays in settling accounts, high transaction fees, limited transparency, and difficulty in having a single entity monitoring and thus detecting errors. Many of these disadvantages are overcome using blockchain technology.

A blockchain network is a peer-to-peer network where each node involved is coupled to one another. A blockchain network does not require a central authority or trusted intermediaries to authenticate or to settle transactions or control the underlying infrastructure. Examples of popular blockchain platforms include Ethereum® and Bitcoin™.

A blockchain network includes a distributed data structure that includes an ordered chain of blocks. Each block stores a hash of its contents, timestamped copies of recent valid transactions, and a hash of the previous block. This ordered relationship ensures that blocks cannot be inserted into or deleted from the chain by a malicious actor. When used in cryptocurrency applications, such as Bitcoin™, the blockchain network also records the balances of digital wallets that are each associated with a user account.

For a transaction to be considered valid, a threshold number of nodes (a quorum) must agree on the transaction. Typically, the quorum is at least 51% of the participating nodes.

Ownership of digital assets in a blockchain network is established through a pair of cryptographic keys: a public key and a private key. Both the keys together are stored in a user's wallet (also referred to as a digital wallet). The private key is used to sign messages/authorize transactions. The public key is used to identify the payer for receiving transactions. The private key must be kept secret by the user at all times because revealing it is equivalent to giving ownership of digital assets. Hence the security of digital wallets is critical in the case of blockchain networks.

A digital wallet can be classified into two main categories: Hot, which is coupled to the Internet, and Cold, which is not coupled to the Internet. Hot wallets are generally associated with everyday usage on desktops and mobile phones. Cold wallets are created for long-term storage of larger amounts of crypto coins. Even though hot wallets are more convenient, they generally come at the risk of losing all the funds to hackers because the keys can be exposed online. The Bitcoin history is full of such cases. Since 2013, more than $15 billion USD were lost due to hacking. Since then, the exchanges have increased their security measures, managing most of their funds in cold storage (approximately 90%) and the rest in a hot wallet to enable daily transactions.

Despite holding a majority of its funds in cold storage, exchanges still fall under the category of hot wallets and attackers keep discovering new ways to breach systems. In 2018 alone, a total of $787 million USD was stolen from four major exchanges (CoinCheck, BitGrail, Coinrail, Zaif).

For protection, the private keys are often stored in a Hardware Security Module (HSM). In addition to storing keys, HSMs can perform other functions, such as generating keys, encrypting data, and digitally signing data. Because HSMs are typically coupled to a network using Transmission Control Protocol/Internet Protocol (TCP/IP) or other Internet protocols, which are vulnerable to hackers, these keys are prone to theft, allowing a malicious party to access data on the HSM.

There is a need to protect the private keys in a blockchain network when the system is connected to the Internet.

SUMMARY OF THE INVENTION

In accordance with the principles of the invention, private keys of a blockchain network are secured and digital assets are thus protected using cold wallets implemented as offline distributed multi-signature Hardware Security Modules (HSMs). The HSMs store all keys in an air-gapped fashion, in contrast to previous technologies in which only a partial amount of digital assets are stored offline. Preferably, a two-hop physically shielded near-field communication (NFC) link is used to pass raw unsigned transaction data from an online server to offline HSM wallets and to receive signed transactions back from the HSM wallets. Requests at the NFC that are unauthorized or unauthenticated are discarded. In effect, because communications with an HSM are established using an NFC protocol and RFID tag, the HSM is taken offline, secured from Internet based cyber attacks.

In a first aspect, a method of performing a transaction over a blockchain network includes receiving instructions for executing a blockchain transaction, ensuring that the instructions are authorized, generating/creating a command to collect signatures for the blockchain transaction, transmitting the command over secure air-gapped connections each associated with one of multiple Data Center Hardware Security Modules (DC HSMs), wherein each DC HSM contains a corresponding private key for executing the command, signing a response at each of the multiple DC HSMs, combining the multiple responses into a multi-signed raw transaction, and transmitting the multi-signed transaction to a destination, such as blockchain network. In one embodiment, the raw command is authorized at a control center before transmitting the command over secure air-gapped connections of the Distributed Data Centers. Preferably, the air-gapped transmission uses a near-field communication (NFC) protocol, using NFC RFID tags. Preferably, the air-gapped connection is physically shielded to resist side channel attacks.

In one embodiment, the method also includes ensuring that at least M of N DC HSMs sign the command using a signing technique before transmitting the signed command to the blockchain network, where N=the total number of DC HSMs, and M≤N, for integers N and M. Preferably M≥N/2.

In some embodiments, the signing technique includes Elliptic Curve Digital Signal Algorithm (ECDSA), RSA, Edwards-Curve Digital Signature Algorithm (EdDSA), or another suitable digital signing algorithm.

In a second aspect of the invention, a cold storage system for storing digital assets includes an integration server coupled to an external network, a central control center including a request handler and a command handling Hardware Security Module (HSM), and multiple distributed data centers. Each of the multiple distributed data centers includes an associated Data Center (DC) HSM for managing cryptographic keys, a processing unit coupled to the DC HSM, a dedicated remote controlled server coupled to the integration server, and an NFC matching pair forming an air-gapped channel between the remote controller server and the processing unit. Preferably, each NFC air-gapped channel is physically shielded to secure against side channel attacks or data skimming. Each of the matching NFC pairs includes NFC read/write pairs and NFC RFID tags. In one embodiment, the external network includes the Internet or a virtual private network.

In one embodiment, the request handler is configured to receive raw commands from the integration server, and the command handling HSM is configured to manually verify and authenticate the raw commands Preferably, an authentication process of the command handling HSM performs this step using a multiple-operator approach.

Preferably, each of the multiple processing units is configured to send and receive commands only from its associated NFC matching pair. Each of the multiple DC HSMs is configured to verify a signed command using digital signatures and to pre-install certificates of the command handling HSM.

In one embodiment, each of the DC HSMs identifies a legitimate request using a public key/certificate of the command handling HSM. In one embodiment, each of the DC HSMs is configured to determine whether one or more associated command execution constraints are met. The command execution constraints include velocity of requests, time bound expiry, or both, to name only a few examples.

The command can include operations such as creating a wallet, withdrawing digital assets from the wallet or moving digital assets between created wallets.

BRIEF DESCRIPTION OF THE DRAWINGS

The following figures are used to illustrate embodiments of the invention. In the figures, the same label refers to the identical or a similar element.

FIGS. 4A and 4B together show a flowchart of a method of processing commands when a user requests either the creation of a wallet or the transferring/withdrawing of funds from a wallet, in accordance with one embodiment of the invention.

DETAILED DESCRIPTION OF THE INVENTION

In accordance with the principles of the invention, an HSM is configured as a cold wallet for all transactions over a blockchain network, by securing private keys used for signing transactions. Preferably, the HSM is coupled to an Integration Server over a near-field communication (NFC) network, which effectively takes the HSM offline. Several definitions are useful for the discussion that follows.

A cold wallet is a private key storage mechanism that is entirely offline.

A hot wallet is a private key storage mechanism that is coupled to the Internet, that is, online.

A Hardware Security Module (HSM) is a physical computing device that safeguards and manages cryptographic keys and provides secure execution of critical code. HSMs have built-in anti-tampering technology which wipes secrets in case of a physical breach. Generally, an HSM uses two sets of cards: Administrative Cards, which are used to enable administrative functions such as Key Recovery, and Operator Cards, which are used by operational staff to perform functions such as signing with cryptographic keys. The Administrator and Operator Card sets are not interchangeable, and access to one does not provide access to the other. To perform operations such as the signing of the transaction, multiple operator cards can be configured so that no single user can process requests on the HSM.

A multi-signature wallet is a wallet in which control over multiple private keys is required to spend from that wallet. In other words, an address in the wallet has multiple private keys behind it. The idea with multi-signature wallets is that multiple people or entities can cooperatively control the funds in the wallet. The "M" of "N" multi-signatures (where M≤N, and M and N are both integers) can be implemented with "N" HSMs acting as controlling entities of which "M" signatures are required to process transactions.

Near-Field Communication (NFC) is a de facto standard for a certain form of radio communication. NFC includes a set of communication protocols that enable two electronic devices to establish communication using NFC tags by bringing them within close proximity of each other. This is a fast and convenient method of data transfer.

Radio Frequency Identification (RFID) is a short-distance electromagnetic method for transmitting small bits of data.

An RFID-Shield is an RFID-blocking shield designed to help insulate a wallet from a very particular brand of electronic pickpocketing, called "RFID skimming."

While the discussion that follows describes digital currencies, it will be appreciated that other digital objects can be secured using the principles of the invention.

Figure 1:
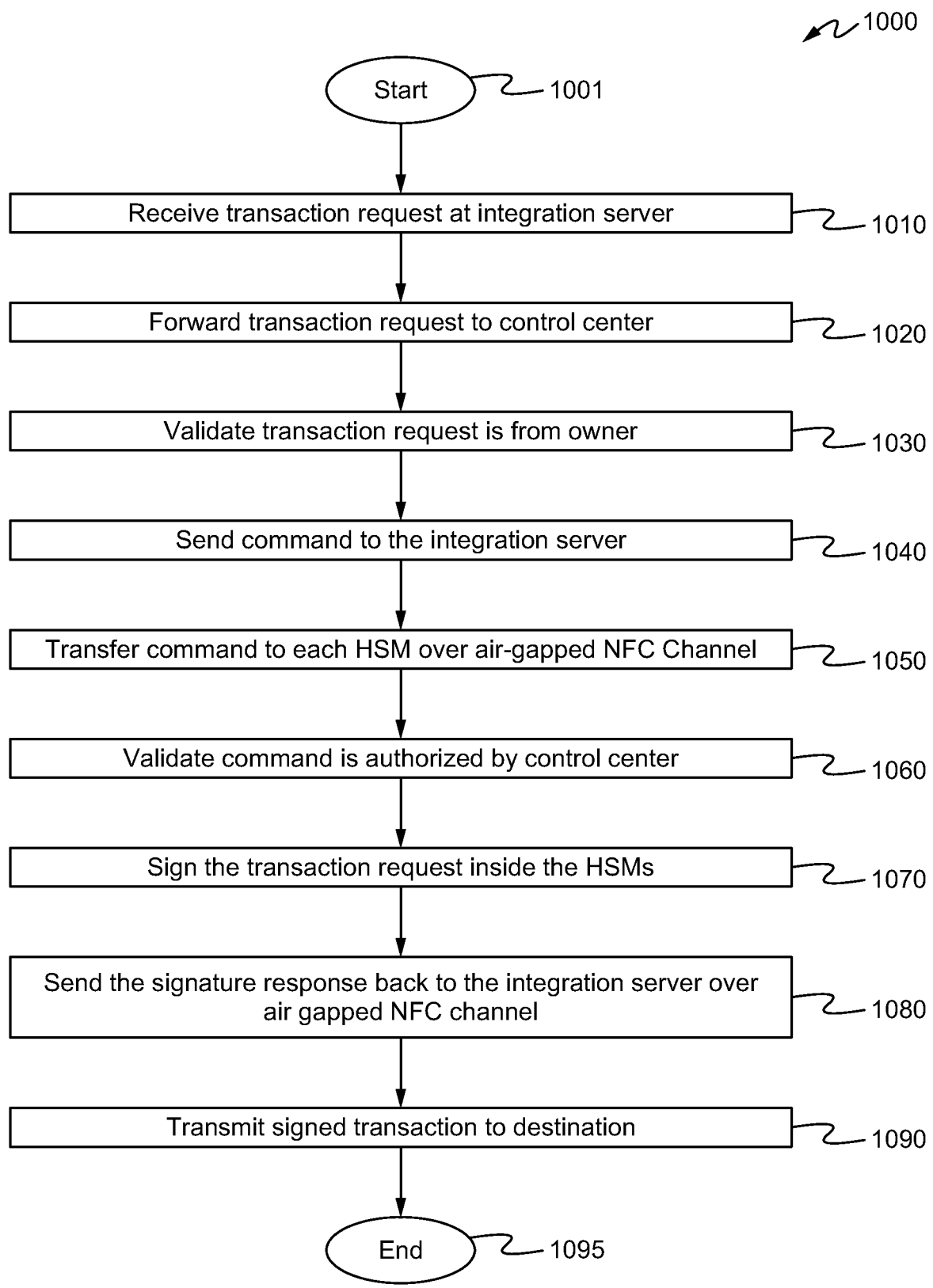
FIG. 1 is a high-level flow chart of a method of securely executing a blockchain transaction in accordance with one embodiment of the invention.

FIG. 1 is a high-level diagram showing how keys, and thus assets, are protected in a blockchain network in accordance with the principles of the invention. The process starts in a step 1001. In a step 1010, a transaction is received from a user (e.g., a person or entity wishing to make a transaction) at an integration server. In a step 1020, the integration server forwards this transaction to a control center. Next in a step 1030, the control center validates the transaction by ensuring that it is authorized by the owner. In a step 1040, a command containing instructions to be executed on the HSMs is sent back to the integration server. In a step 1050, the integration server transfers the command to multiple data centers over a TCP/IP connection.

At each data center, the command is transmitted to a corresponding DC HSM over an air-gapped communication channel using NFC protocol in a manner that ensures security. Preferably, the air-gapped communication channel is shielded, such that the NFC communication cannot be read by eavesdroppers or other malicious actors. In this way, even if the TCP/IP connection is compromised, a malicious actor cannot intercept any of the communications to the DC HSM. In effect, the DC HSM is offline, that is, a "cold wallet." At worst, if a malicious attack is attempted, a user will receive a denial of service (DoS) message and the transaction will be terminated.

In a step 1060, each of these DC HSMs verifies that the request is authorized by the control center. In some embodiments, each DC HSM tests for a corresponding constraint, such as for a control center signature or for non-stale commands, and ensures that the constraint is met before signing the transaction.

In a step 1070, the transaction request is signed inside each DC HSM, and in a step 1080 the signature is transmitted back over the air-gapped communication channel to the integration server. In a step 1090 the integration server builds a signed transaction using these collected signatures and ultimately transmits the signed transaction to its intended recipients, such as by broadcasting the transaction over a blockchain network. In a step 1095, the process ends.

Figure 2:
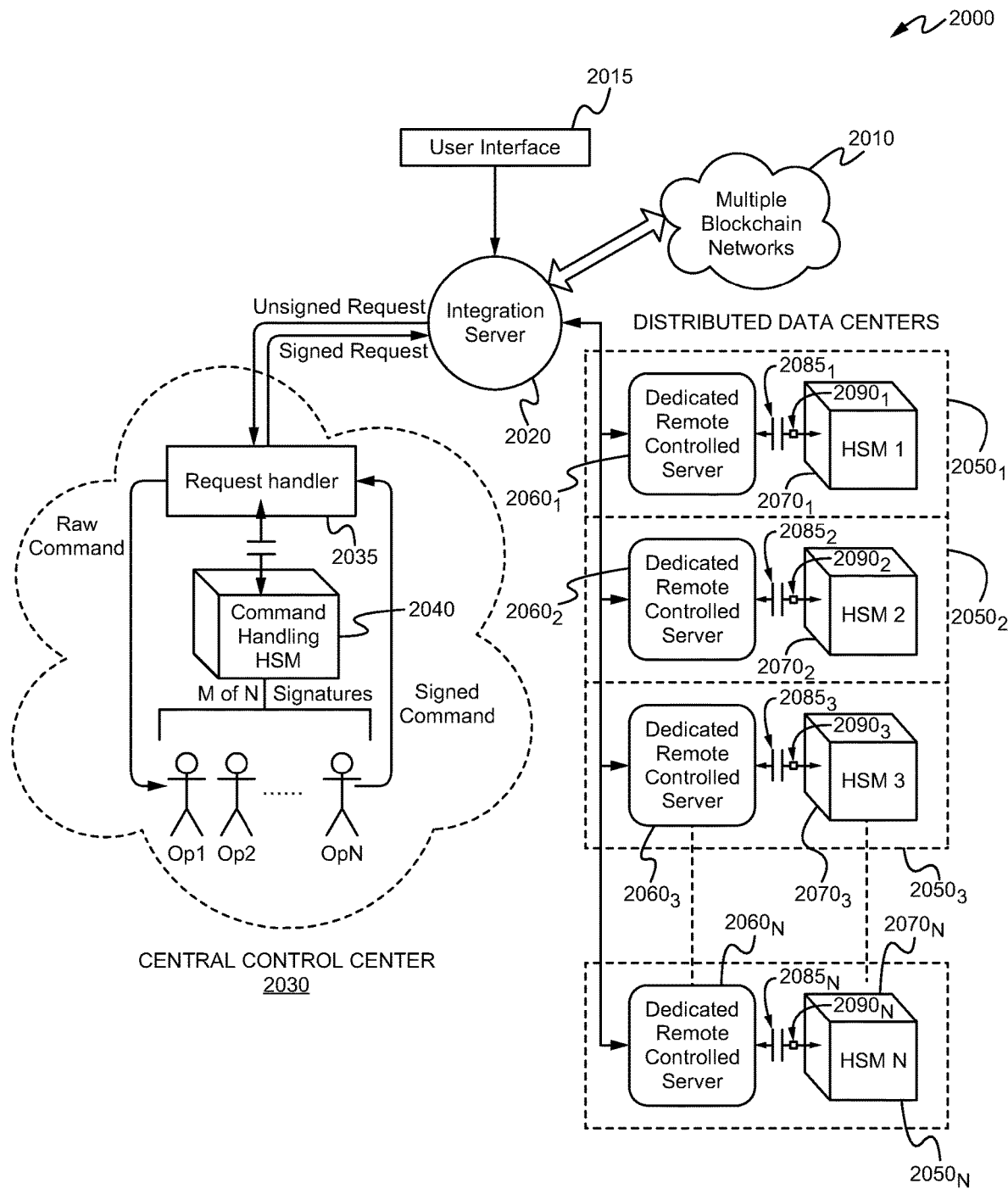
FIG. 2 is a schematic diagram of a system in accordance with one embodiment of the invention.

FIG. 2 is a block diagram of a system 2000 in accordance with one embodiment invention, coupled to multiple blockchain networks 2010. The system 2000 includes a user interface 2015 coupled to an integration server 2020. The integration server 2020 is coupled to the multiple blockchain networks 2010, a Central Control Center 2030, and multiple Distributed Data Centers $2050_1$, $2050_2$, ..., $2050_N$ (i.e., $2050_{i=1\ to\ N}$). The Central Control Center 2030 includes a Request Handler 2035 and a Command Handling HSM 2040 configured to receive signatures from N operators OP1-OPN, for integer N.

Each of the Distributed Data Centers $2050_{i=1\ to\ N}$ is coupled to the Integration Server 2020. Each of the Distributed Data Centers $2050_{i=1\ to\ N}$ includes a Dedicated Remote Controlled Server $2060_i$ coupled to the Integration Server 2020 and also coupled to a corresponding DC $HSM_i$ over a matched NFC pair $2085_i$ (each, described in more detail below, having an air-gap) and a Processing Unit $2090_i$.

In operation, an unsigned request is sent from the user interface 2015 to the Integration Server 2020, which forwards the unsigned request to the Request Handler 2035. The Request Handler 2035 sends the unsigned request to the Command Handling HSM 2040 for signatures from the Operators OP1-OPN. If a threshold M out of N operators sign the request, thereby validating it, a command is created and sent back to the Request Handler 2035. The Request Handler 2035 forwards the command to the Integration Server 2020, which then forwards the command to the Data Centers $2050_{i=1\ to\ N}$ for processing. As some examples, the processing can include commands to create a wallet, withdraw funds, etc.

Figure 3:
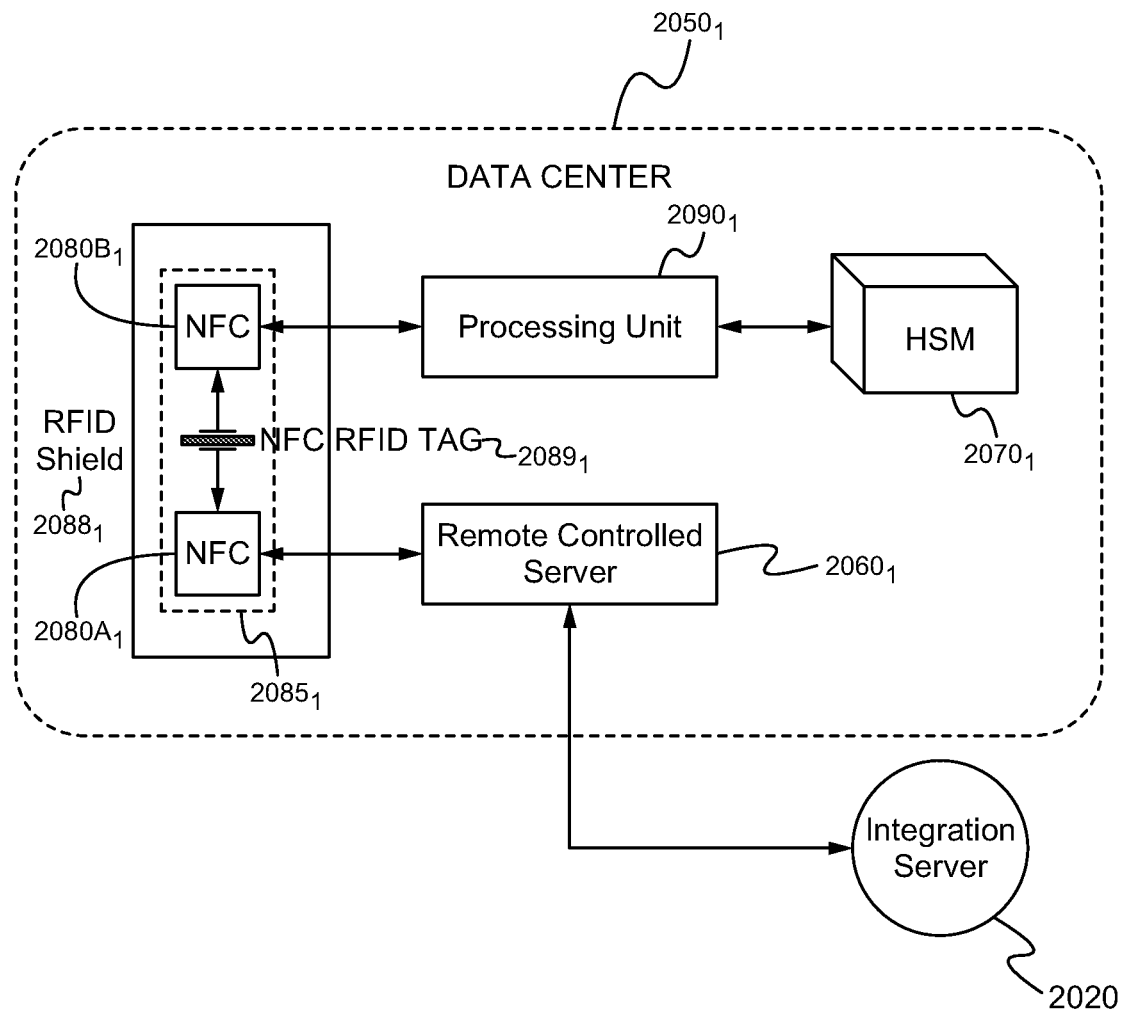
FIG. 3 shows a Data Center of FIG. 2, in accordance with one embodiment of the invention.

FIG. 3 is a more detailed block diagram of an exemplary Data Center $2050_1$ in accordance with one embodiment of the invention. As shown in FIG. 3, the Data Center $2050_1$ is coupled to the Integration Server 2020 through a Remote Controlled Server $2060_1$. The Remote Controlled Server $2060_1$ is coupled to a matched NFC adapter pair $2085_1$ that includes a first NFC $2080A_1$ coupled to the Remote Controlled Server $2060_1$ and to a second NFC $2080B_1$ over an air gap. Each of NFC $2080A_1$ and NFC $2080B_1$ has an NFC RFID tag $2089_1$, which provides read/write capabilities for securely communicating with each other. The NFC pair $2085_1$ is surrounded by an RF shield $2088_1$. The second NFC $2080B_1$ is coupled to a Processing Unit $2090_1$, which in turn is coupled to its corresponding DC HSM $2070_1$.

Because the DC HSM $2070_1$ is coupled to the Integration Server 2020 and thus ultimately to the Multiple Blockchain Networks 2010 over an air gap and not an IP connection, the DC HSM $2070_1$ is referred to as a "cold" HSM.

This unique type of communication between the Command Handling HSM 2040 and the DC HSMs $2070_{i=1\ to\ N}$, through the Integration Server 2020, is carried out by specially signed message communication and over the NFC protocol. Therefore, even if an intruder were to seize the external system, access to the internal system is prevented. At most, a malicious attacker can only cause a DoS attack.

Figure 4B:
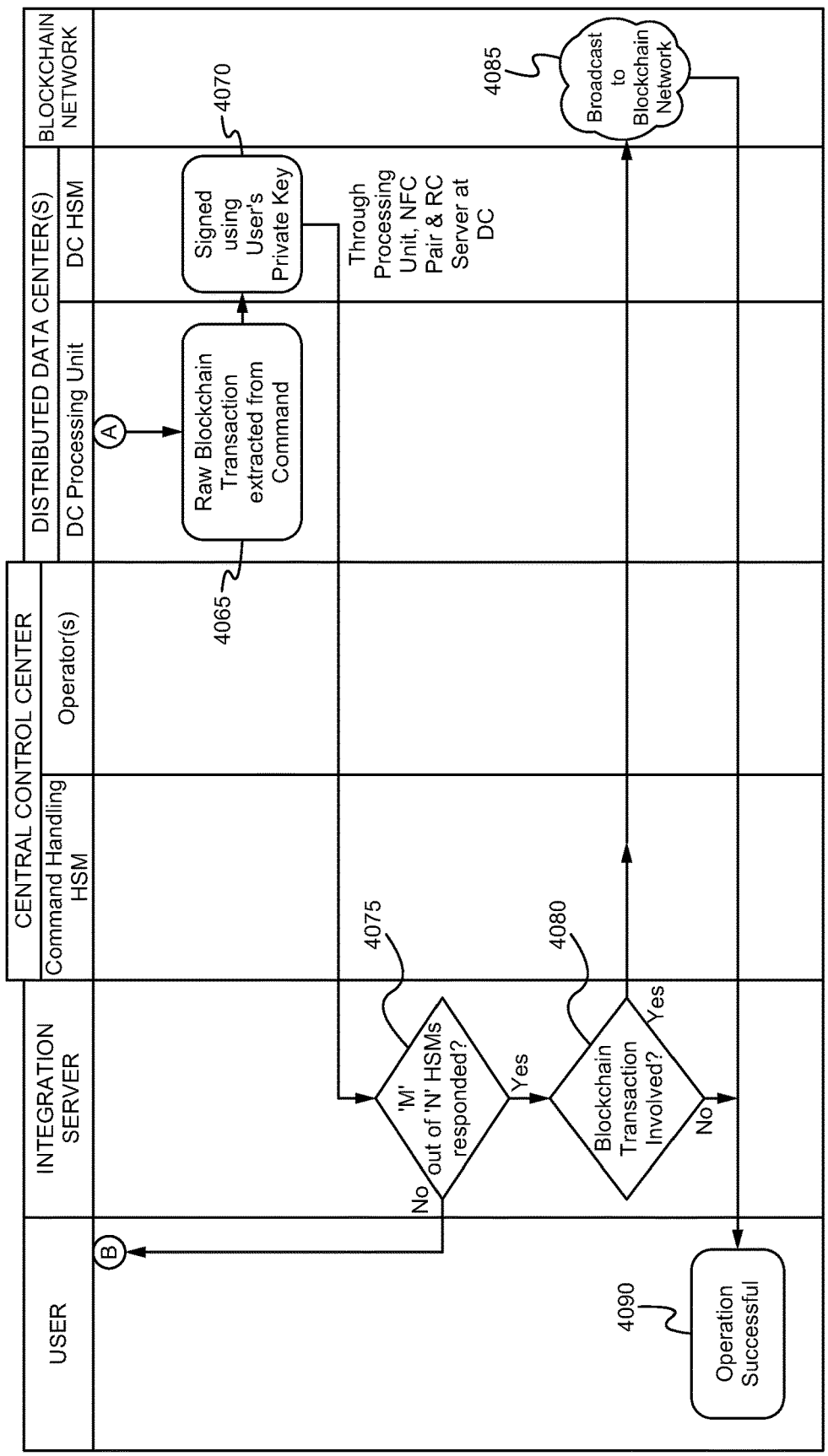

FIG. 4 (FIG. 4A continued in FIG. 4B) shows the steps 4000 of a method of processing commands when a user requests that the system either generate a wallet or transfer/withdraw funds. In this example, the elements of FIG. 2 are used to tie the steps of the method with the components of a system in accordance with the embodiments. Referring to FIGS. 2 and 4, in a step 4005, a user makes a request from a device 2015 connected to the Internet. Next, in a step 4010, the integration server 2020 determines whether the user has been authenticated. If the user has been authenticated, the process continues to a step 4020; otherwise, the process continues to a step 4015, where the process is terminated based on a user authentication error.

In the step 4020, the Integration Server 2020 creates an unsigned transaction for the Command Handling HSM 2040, with a raw blockchain transaction as payload. Next, the method continues to a step 4025, where the operators authorize the transaction, and continues to a step 4030, where it is determined whether M signatures have been collected from the operators. If M signatures have not been collected, the process loops back to the step 4025; otherwise, the process continues to a step 4035.

In the step 4035 the Command Handling HSM 2040 signs the command using the Organization Private Key and transmits the signed command to the Integration Server 2020. In a step 4040, the Integration Server 2020 receives the signed command containing a raw blockchain transaction and transmits the signed command to each Processing Unit $2090_{i=1\ to\ N}$ at the Distributed Data Centers $2050_{i=1\ to\ N}$. In a step 4045, each Processing Unit $2090_{i=1\ to\ N}$ determines whether the signature on the command is verified. If each Processing Unit $2090_{i=1\ to\ N}$ determines that the signature on the command is verified, the process continues to a step 4055; otherwise, the process continues to a step 4050. In the step 4050, the process is terminated based on an Unauthorized Command Error.

In the step 4055, each Processing Unit $2090_{i=1\ to\ N}$ determines whether its associated command execution constraints have been met. If each Processing Unit $2090_{i=1\ to\ N}$ determines that the constraints have been met, the process continues to a step 4065; otherwise, the process continues to the step 4060. In the step 4060, the transaction is terminated based on a Command Constraint Error.

In the step 4065, each Processing Unit $2090_{i=1\ to\ N}$ extracts the raw blockchain transaction from the command and transmits the raw blockchain transaction data to the corresponding DC HSM $2070_{i=1\ to\ N}$. Next, in a step 4070, each DC HSM $2090_{i=1\ to\ N}$ signs the raw blockchain transaction data using the User's private key. Each DC HSM $2090_{i=1\ to\ N}$ then transmits the signed transaction data through its corresponding Processing Unit $2090_{i=1\ to\ N}$ to its NFC pair $2085_{i=1\ to\ N}$ to its Remote Controlled Server $2060_{i=1\ to\ N}$ and to the Integration Server 2020.

Next, in a step 4075, the Integration Server 2020 determines whether at least M out of N DC HSMs have responded. If at least M out of N DC HSMs have responded, the process continues to a step 4080; otherwise, the process loops back to the step 4040. In the step 4080, the Integration Server 2020 determines whether a blockchain transaction was involved. If a blockchain transaction was involved, the process continues to a step 4085; otherwise, the process continues to a step 4090, where the user receives notification that the operation was successful. In the step 4085, the transaction is broadcast to the blockchain network, and the process continues to the step 4090.

The process of initializing an HSM includes (1) erasing the HSM, (2) creating a new master key for the HSM, and (3) creating a new Administrator Card Set to protect this master key. This master key cannot be exported and remains stored inside the non-volatile memory of the HSM until the module is re-initialized.

Typically, an HSM is initialized by selecting the item "Module initialization" from the main menu available on the HSM's front panel. Next, a default quorum for the Administrative Card Set (ACS) is selected. The quorum is the maximum number of administrative cards (K) required by default for an operation. Also, the total number of administrative cards (N) intended to be used must be specified in this step. Next a Blank card for the ACS is inserted. A prompt will appear to confirm that the user wants to use the card. If required, certain operations (such as recovery and replacement) can be disabled for the card.

Next, an Operators Group is created for the HSM. To create the Operators Group, the HSM will authenticate the previously created administrators and will create a physically controllable smart card for each member of the new Operators Group. Each member of the Operators Group can be configured to have access to only certain operations. After this procedure is finished, the HSM is initialized.

After initialization, whenever the key needs to be used, operators must present their cards to the HSM. The loading of a key can be used based on a predefined policy, such as, at least M operator cards must be authorized out of a total N operator cards. Once the key is loaded on the HSM's memory, it is possible to use it, for instance, to sign a transaction.

Figure 5:
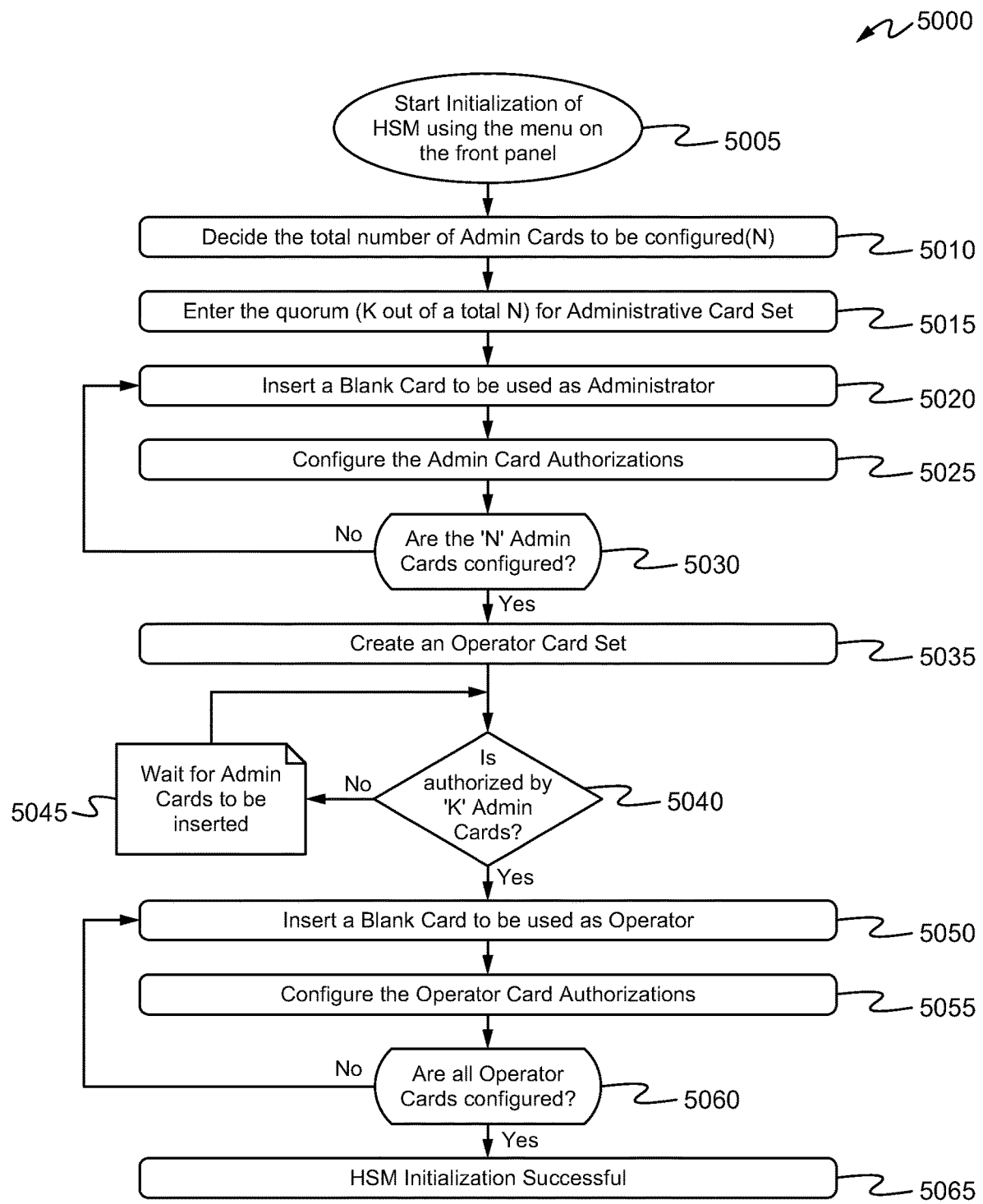
FIG. 5 is a flowchart of a method of initializing an HSM and configuring Administrator and Operator Card groups, in accordance with one embodiment of the invention.

FIG. 5 shows the steps 5000 of method to initialize an HSM and configure both Administrator and Operator Card groups required for further operation processing using the HSM, in accordance with one embodiment of the invention. As used herein, at least two card sets are used in performing operations in accordance with embodiments of the invention, an Administrator Card Set and an Operator Card Set. The two card sets allow holders of each set to perform specific functions. Each card set contains a set of keys that authorize specific actions. The Administrator Cards are not used in normal operation, but only in cases when the HSM is set up or restored, or when Operator Cards are recovered.

Referring to FIG. 5, in a step 5005, a security officer activates initializing the HSM using a menu on the HSM's front panel. Next, in a step 5010, the security officer determines the total number of Administrator Cards to be configured, in this example, integer N. In a step 5015, the security officer enters the quorum for the Administrator Card Set needed to authorize a transaction, here integer K, where K≤N. Next, in a step 5020, a blank Administrator Card is inserted into the HSM, and in a step 5025 the Administrator Card is configured with authorizations. Next, in a step 5030, the HSM determines whether the N Administrator Cards have been configured. If all N Administrator Cards have been configured, the process continues to a step 5035; otherwise, the process loops back to the step 5020.

In the step 5035, the HSM receives a command to create an Operator Card Set. Next, in a step 5040, the HSM determines whether this operation is authorized by K Administrator Cards. If the operation has been authorized by K Administrator Cards, the process continues to a step 5050; otherwise the process continues to a step 5045. In the step 5045, the process waits for K Administrator Cards to be inserted for the authorization to be performed and then loops back to the step 5040.

In the step 5050, a blank Operator Card is inserted, and in the step 5055, the inserted Operator Card is configured with authorizations. Next, in a step 5060, the HSM determines whether all the Operator Cards have been configured. If all the Operator Cards have been configured, the process continues to a step 5065, where it is determined that the HSM Initialization is successful. If in the step 5060 it is determined that not all of the Operator Cards have been initialized, the process loops back to the step 5050.

The Administrator Cards are not used in normal operation, but only in cases when the HSM is set up or restored, or when Operator Cards are recovered. The Operators Card Set is used by operational staff to perform functions such as signing with the generated cryptographic keys. Preferably, multiple operator cards are created, so that no single card has the authority to process the requests.

It will be appreciated that the Administrator and Operator cards are not interchangeable, and access to one does not provide access to the other. Inside the HSM secure module area, the integrity and confidentiality of all other objects are guaranteed by encrypting everything with the private key embodied in the security world.

In operation of one embodiment, an HSM is initialized, Administrator and Operator card sets are configured. For systems with N HSMs, at least K Administrator cards are configured and an Operator card set is configured. When a request for a transaction is received at an integration server, the command is transferred to a request handler. At least M operators must manually validate the transaction. Among other things, each operator performs different checks to determine the validity of the command. Alternatively, a transaction is validated automatically using a software agent. In other embodiments a command handling HSM then signs the command with the organization's private key. This signature establishes the authenticity and integrity of the request for the flow of commands down the pipeline, to protect downstream HSMs against possible intrusion. The command handler then transmits the request to the integration server in any suitable format, such as JavaScript Object Notation (JSON) or Extensible Markup Language (XML), to name only two such formats. The request handler then receives the signed command and transmits it to multiple distributed data centers.

Each data center includes a dedicated remote controlled server coupled to the integration server, a shielded NFC pair coupling the remote controlled server to a processing unit, which in turn is coupled to a DC HSM. At each data center, the signed command is transferred using the NFC protocol to the offline processing unit. The signature is verified using the organization's public key stored in the DC HSM. An agent at the DC HSM performs and enforces checks on the behavior of command execution. For example, an agent on DC $HSM_1$ may check that the command is not stale, such as being signed too long ago, and an agent on DC $HSM_2$ may check that the command is not a duplicate. It will be appreciated that in some embodiments, a single agent can perform multiple checks.

At each data center, after it has been determined that its associated one or more checks have been passed, the raw unsigned blockchain transaction is extracted from the signed command and passed to the corresponding DC HSM to be signed using the user's private key. Typically, the extraction is only needed for transfer requests by a user or for wallet generation requests on certain blockchains.

Next, after M out of N of the multiple DC HSMs have responded with payloads containing signatures, the operation requested by the user is carried out and its response data is passed back to the integration server. If the request involves a blockchain transaction, the response data is broadcast to the network.

While the examples above are directed to digital wallets, it will be appreciated that the principles of the invention can be used with other digital assets such as titles of ownership, medical records, and supply chains, to name only a few examples.

It will be readily apparent to one skilled in the art that various other modifications may be made to the embodiments without departing from the spirit and scope of the invention as defined by the appended claims.

What is claimed is:

1. A method of performing a transaction over a blockchain network, the method comprising:
   receiving instructions for executing a blockchain transaction;
   ensuring that the instructions are authorized;
   on the basis of the received instruction, generating a command to collect signatures for the blockchain transaction;
   transmitting the command using a secure air-gapped process to multiple Data Center Hardware Security Modules (DC HSMs), wherein each DC HSM contains a corresponding private key for signing the blockchain transaction;
   validating an authenticity of the received command at each of the multiple DC HSMs;
   securely signing the blockchain transaction inside each of the multiple DC HSMs using a signing technique and transferring signatures back using the secured air-gapped process;
   building a multi-signed transaction from collected DC HSM signatures; and
   transmitting the multi-signed transaction to a destination,
   wherein the secure air-gapped process uses near field communication (NFC) interfaces and NFC Radio Frequency Identification (RFID) tags, and
   wherein the NFC interfaces are physically shielded.

2. The method of claim 1, wherein the destination comprises a blockchain network.

3. The method of claim 1, wherein the NFC interfaces are physically shielded to resist side channel attacks.

4. The method of claim 2, further comprising ensuring that at least M of N DC HSMs sign the blockchain transaction before transmitting the multi-signed transactions to the blockchain network, where N=a total number of DC HSMs, and M≤N, for integers N and M.

5. The method of claim 4, wherein the signing technique comprises Elliptic Curve Digital Signature Algorithm (ECDSA), Edwards-Curve Digital Signature Algorithm (EdDSA), RSA, or any combination thereof.

6. A cold storage system for storing digital assets comprising:
   a. an integration server, including a processor and a memory, coupled to an external network;
   b. a central control center comprising a request handler and a command handling Hardware Security Module (HSM); and
   c. multiple distributed data centers each comprising:
      i. an associated Data Center (DC) HSM for managing cryptographic keys;
      ii. a processor coupled to the associated DC HSM;
      iii. a dedicated remote controlled server coupled to the integration server; and
      iv. a physically shielded near field communication (NFC) adapter pair having a Radio Frequency Identification (RFID) tag forming an air-gapped communication channel between the remote controlled server and the processor coupled to the associated DC HSM.

7. The cold storage system of claim 6, wherein each of the NFC adapter pairs comprises NFC devices and tags physically shielded to avoid side channel attacks, data skimming, or both.

8. The cold storage system of claim 7, wherein each of the NFC adapter pairs comprises NFC devices having both read/write capabilities comprising NFC tags between the NFC devices.

9. The cold storage system of claim 6, wherein the external network comprises the Internet or a virtual private network.

10. The cold storage system of claim 6, wherein the request handler is configured to receive raw instructions to execute blockchain transactions from the integration server and to send the raw instructions to the command handling HSM over the air-gapped channel.

11. The cold storage system of claim 10, wherein the raw instruction is authorized by the command handling HSM through a multiple factor authentication protocol.

12. The cold storage system of claim 6, wherein each of the multiple processors of the distributed data centers is configured to send and receive commands only from its associated NFC adapter pair.

13. The cold storage system of claim 6, wherein each of the multiple associated DC HSMs is configured to verify an authenticity of received commands using digital signatures and pre-installed certificates of the command handling HSM.

14. The cold storage system of claim 6, wherein each of the associated DC HSMs is configured for determining whether an associated one or more command execution constraints are met.

15. The cold storage system of claim 14, wherein the command execution constraints comprise velocity of requests, time bound expiry, or both.

* * * * *